(12) United States Patent
Shaw et al.

(10) Patent No.: US 11,625,564 B2
(45) Date of Patent: Apr. 11, 2023

(54) SETTING PRINT SUPPLIES FOR PROCESS BLACK PRINT BASED ON SUPPLY LEVELS

(71) Applicant: HEWLETT-PACKARD DEVELOPMENT COMPANY, L.P., Spring, TX (US)

(72) Inventors: Mark Q. Shaw, Boise, ID (US); Gabriel Scott McDaniel, Boise, ID (US); Scott K. Hymas, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/330,043

(22) Filed: May 25, 2021

(65) Prior Publication Data

US 2022/0383058 A1 Dec. 1, 2022

(51) Int. Cl.
*G06K 15/00* (2006.01)
*G06K 15/02* (2006.01)

(52) U.S. Cl.
CPC ..... *G06K 15/4075* (2013.01); *G06K 15/1823* (2013.01)

(58) Field of Classification Search
CPC .......... G06K 15/4075; G06K 15/1823; G06K 15/407; G03G 15/556
See application file for complete search history.

(56) References Cited

U.S. PATENT DOCUMENTS

| | | | |
|---|---|---|---|
| 2005/0200642 A1* | 9/2005 | Baba | G06K 15/102 347/15 |
| 2015/0273855 A1* | 10/2015 | Ishihara | B41J 2/21 347/9 |
| 2020/0096915 A1* | 3/2020 | Hashimoto | G03G 15/0189 |

* cited by examiner

*Primary Examiner* — Iriana Cruz
(74) *Attorney, Agent, or Firm* — Brooks, Cameron & Huebsch, PLLC

(57) ABSTRACT

An example method comprises setting a mixture of a plurality of print supplies of a print device to use for a process black print based on a plurality of supply levels corresponding to the plurality of print supplies. The example method further comprises initiating execution of the process black print of a print job by the print device using the set mixture of the plurality of print supply as overlapping colorant with the black print supply of the print device.

20 Claims, 7 Drawing Sheets

SETTING PRINT SUPPLIES FOR PROCESS BLACK PRINT BASED ON SUPPLY LEVELS

BACKGROUND

Various types of devices include replaceable print supplies, such as inkjet printhead assemblies, and print material containers for two-dimensional (2D) or three-dimensional (3D) print devices. Example print material containers include inkjet cartridges, toner cartridges, ink and toner supplies, and build material supplies, among others. In some instances, print devices may have a set of print supplies used to print in black and in color.

DETAILED DESCRIPTION

Figure 1:
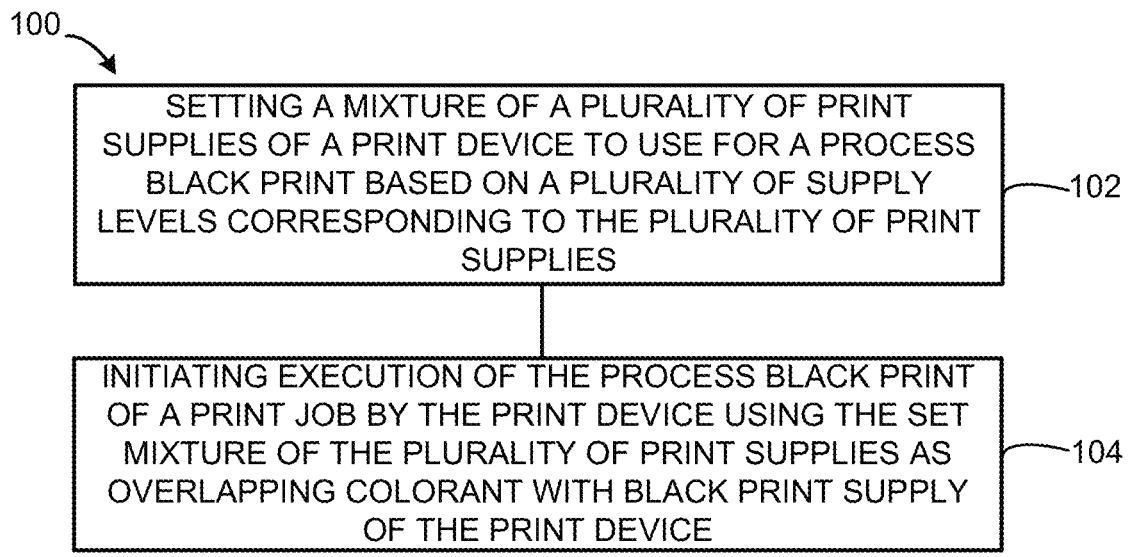
FIG. 1 illustrates an example method for setting a mixture of print supplies for a process black print, in accordance with examples of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Documents may be used to disseminate information and may include printed forms. A printed document may be produced by a print device based on data received from a computing device. Various types of print devices use replaceable print supplies to produce printed documents, such as 2D and 3D print devices. The print device may form markings using marking material, such as using liquid print fluids or powdered toner, on the print media based on the data received. Example 2D and 3D print devices include inkjet printers, dry toner printers, liquid toner printers, and 3D powder bed inkjet printers. Example print supplies include print material containers, such as ink tanks, ink bottles, inkjet printhead cartridges, dry toner reservoirs, liquid toner reservoirs, dry toner cartridges, and build material supplies. Many print devices include a plurality of print supplies comprising black print supply and non-black print supply, and which may be consumed while printing in black and in color.

As the black print supply is depleted, the print quality of the black print may degrade. To improve print quality, a process black print may be used which supplements the black print supply with non-black print supply to increase an optical density of the black content as compared to using the black print supply alone. The process black print may be more expensive per page than the black print. Additionally, the set of print supplies may deplete at different rates, resulting in multiple replacement processes, which may increase the cost to replace print supplies.

Examples of the present disclosure are directed to setting a mixture of a plurality of print supplies to use for a process black print based on supply levels of the print supplies installed within the print device. The mixture may be set to coordinate depletion of the plurality of print supplies. By coordinating depletion of the plurality print supplies, multiple print supplies of the plurality may be replaced in a replacement order and/or at the same time, which may reduce shipping costs and/or service costs while minimizing degrading of the print performance and improving user satisfaction. For example, black print supply may be supplemented with non-black print supply to generate black content at an improved print quality as compared to using the black print supply alone and optionally while waiting for a replacement black print supply to be received.

Turning now to the figures, FIG. 1 illustrates an example method for setting a mixture of print supplies for a process black print, in accordance with examples of the present disclosure.

At 102, the method 100 includes setting a mixture of a plurality of print supplies of a print device to use for a process black print based on a plurality of supply levels corresponding to the plurality of print supplies. As previously described, the print supplies may include ink or toner which are in print material containers. In some examples, the print device may have a plurality of print supplies installed which includes a black print supply and a plurality of non-black print supplies. The plurality of non-black print supplies may be separate from one another, such that each of the non-black print supplies are in a separate print material container. However, examples are not so limited and the plurality of non-black print supplies may be in a single print material container, such as a 3-in-1 color ink or toner cartridge. In some examples, the plurality of print supplies includes cyan (C), magenta (M), yellow (Y), and black (K) print supplies, which is sometimes herein referred to as CMYK.

Each print supply may have an associated supply level, which indicates an amount of print supply that is depleted and/or that remains. As used herein, a supply level refers to or includes an estimated or measured remaining amount of marking material (e.g., ink or toner) of a print supply. The print device executes print jobs by printing out documents using the plurality of print supplies. The supply levels may be identified by the print device based on a page count that estimates an average number of pages per print supply and/or using sensors to detect the supply levels. In some examples, the method 100 may include identifying the plurality of supply levels and/or tracking the plurality of supply levels over the supply lifetimes of the print supplies.

The plurality of print supplies may be used by the print device to execute different types of print jobs. For example, the print device may be designed to print in black and in color. Due to the different types of print jobs and print supplies used to perform the printing, the plurality of print supplies may be used at different rates, which is generally referred to as a "consumption rate". Variances in consumption rates for respective print supplies of the plurality may cause the print supplies to be depleted at different times. With a print material container having multiple print supplies, depletion of one of the print supplies may result in unused or wasted print supplies in other reservoirs.

Black content may be executed using a black colorant, sometimes referred to as a "black print" or a "K-black print", or using black colorant and non-black colorant, sometimes referred to as "a process black print". As used herein, a black print includes or refers to printing black content using black print supply without non-black print supply.

A process black print includes or refers to printing black content using the black print supply and a non-black print supply. In some examples, one non-black print supply, two non-black print supplies, or the plurality of non-black print supplies are used in a process black print. The non-black print supply may be used as an overlapping colorant, e.g., under or over, with the black print supply, such as by overlaying one colorant under another. In some examples, non-black print supply is used as an under colorant for the black print supply, and in some examples, non-black print supply is used as an over colorant for the black print supply. An overlapping colorant may refer to or include a colorant that covers a common space of the print media as a black colorant. The overlapping colorant may intersect the black colorant in height, width, and/or depth directions of the print media.

When the black print supply is depleted below a threshold, a black process print may be used to improve the print quality of printed black content until the black print supply may be replaced. For example, as the K optical density falls below a threshold, combinations of CMY print supply may be used to supplement or augment the K print supply and to increase the optical density of black content on the printed document. In some examples, the process black print is executed or produced by overlapping layers of dots of the set mixture of the CMY print supply, with the K print supply being added over or under.

Setting the mixture of the plurality of print supplies may include selecting non-black print supplies of the plurality of print supplies and selecting a percentage of the selected non-black print supplies to use as the overlapping colorant with the black print supply. The selected non-black print supplies, sometimes herein referred to as "a set of non-black print supplies", is adjustable over time and based on the supply levels and/or variances in depletion of print supplies. As further described herein, variances in depletion of the print supplies may include, be caused by, and/or result in variances in supply levels, consumption rates, and/or supply lifetimes. Further, the percentage of each of the selected non-black print supplies is adjustable over time and based on the supply levels and/or variances in depletion. The percentage may be the same or different for each of the selected non-black print supplies. For example, if the supply levels are 10 percent (%) K 60% C, 70% M, and 10% Y, the set mixture may include 50% C and 50% M or 40% C and 60% M. As another example, if the supply levels are 10% K 80% C, 60% M, and 70% Y, the set mixture may include 100% C.

In various examples, setting the mixture of the plurality of print supplies includes selecting a set of non-black print supplies among the plurality of non-black print supplies to use as the overlapping colorant with the black print supply to coordinate depletion of the plurality of print supplies and to increase optical density as compared to a black print using the black print supply without the set of non-black print supplies. For example, the method 100 may include identifying variances between the plurality of supply levels, and selecting the set of non-black print supplies based on the variances. The set of non-black print supplies may include between one non-black print supply and the plurality of non-black print supplies (e.g., one color to three).

The method 100 may include setting the mixture of the plurality of print supplies based on a rebuilt color map for the process black print. A color map, as used herein, includes or refers to a look-up table that includes a plurality of nodes representing a sampling of a color space and supply output values for colors of the color space. In some instances, the look-up table includes the supply output values corresponding to the plurality of nodes and may be referred to as the "color separation". The color space may include a plurality of different colors (e.g., a spectrum), such as a range of potential colors that a print device may produce or create using different combinations of the plurality of print supplies (e.g., CMYK). Supply output values include or refer to values or amounts of the plurality of print supplies to use to achieve the different colors of the color space in the color map. In some examples, the color map may include $17^3$, $17^4$, or $19^4$ nodes, among other amounts, and with the plurality of nodes representing samplings of the range of potential colors. In some examples, the color map may include or represent a three dimensional cube containing the nodes in three dimensions, as further shown by FIG. 6. Each node of the cube may represents a color in three dimensions, such as having coordinates of x, y, and z. For example, for gray colors, the diagonal of the cube containing the nodes may go from white to black, and moving out towards the other corners of the cube, the cube goes from gray to full color.

The plurality of nodes may include sets of different color nodes. For example, the plurality of nodes may include a set of gray nodes that represent a black color across a gray scale. The plurality of nodes may further include a set of near neutral nodes that represent different near neutral colors across a near neutral color scale, as well as different sets of color nodes, such as sets of blue nodes, green nodes, red nodes, yellow nodes, orange nodes, purple nodes, pink nodes, brown nodes, among other colors. Near neutral colors include or refer to colors that appear to be neutral or without color but that are not a neutral color, such off-white, tan, ivory, among others. Near neutral colors may be created by combining a primary color with a neutral color, such as white, brown, black, or gray.

In some examples, the color map may be rebuilt by a local or remotely-located computing device, and sent to the print device. In some examples, the color map is rebuilt by the print device.

Figure 5:
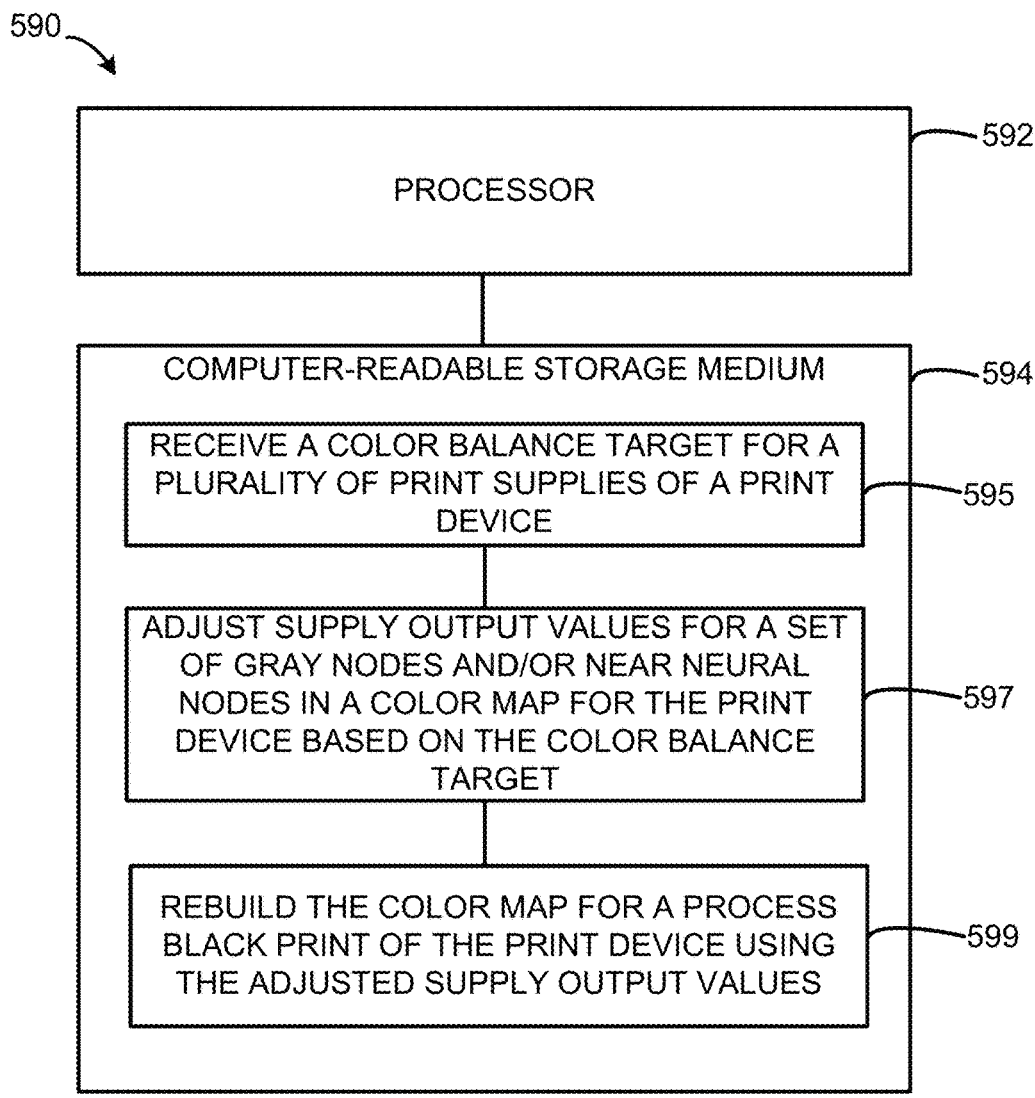
FIG. 5 illustrates an example device including non-transitory computer-readable storage medium, in accordance with examples of the present disclosure.

As further described by FIG. 5, the color map may be rebuilt to achieve a color balance target. The color balance target may be based on the plurality of supply levels of the plurality of print supplies. For example, the color balance target may be used to reduce variances in the plurality of supply levels as further described herein. The rebuilt color map may include supply output values for a set of gray nodes and/or near neutral nodes which are adjusted based on the color balance target. Supply output values for different gray colors and/or near neutral colors in the color map may be modified to shift the color balance of the black point for a process black print and without changing a color balance of other colors in the color map that may be off-center in the color map, such as the near neutral nodes. The color map is rebuilt with the adjusted supply output values that are assigned to the set of gray nodes and/or near neutral nodes in such a way that the color balance of the black point may not be noticeable to the human eye.

The set mixture of the plurality of print supplies for the process black print may be based on the adjusted supply output values for the set of gray nodes and/or near neutral nodes in the rebuilt color map. For example, the set mixture for a particular gray color in the print job may be based on or include interpolation of adjusted supply output values of surrounding nodes of the particular gray color in the adjusted color map. The color map may not include a node for each potential color of the range, and may include colors that are between nodes. In some examples, supply output values of surrounding nodes of respective colors in the color map are interpolated to achieve final supply output values for the range of potential colors. For example, when creating a specific gray color of the gray node, the weight of the gray node may be 100 percent and the surrounding nodes are zero percent. As the created gray color moves away from the specific gray color of the gray node, such as for a near neutral color, the contribution of the gray node decreases and the contribution of surrounding nodes increase. In some examples, the set mixture of the plurality of print supplies may include different mixtures for different gray colors and/or near neutral colors in the print job, although examples are not so limited.

In some examples, the plurality of print supplies may have variances in supply lifetimes, such as different print supplies of the set having different supply lifetimes. As used herein, supply lifetime of a print supply includes an estimated amount of time and/or pages remaining until depletion of the print supply. Coordinating the depletion of the set of print supplies may include reducing the variances in the supply lifetimes of the set of print supplies, and in some examples, may eliminate or prevent variances in the supply lifetimes of the set of print supplies such that a plurality of print supplies of the set of print supplies are depleted at the same time or within a threshold amount of time. With a print material container having multiple print supplies, coordinating depletion of the print supplies may result in reduced waste of print supply.

In some examples, the method 100 includes setting the mixture of the plurality of print supplies based on a pattern of use of the print supplies. The pattern of use may include current consumption rates of print supplies for the print device and/or for a particular user, trends of consumption rates of print supplies for the print device over time, and/or predicted consumption rates for the print device and/or the particular user. A consumption rate refers or includes to the rate the print supply is used or consumed. For example, the method 100 may include identifying the plurality of supply levels corresponding to the plurality of print supplies, identifying a pattern of use of the plurality of print supplies using the plurality of supply levels, and setting the mixture of the plurality of print supplies based on the pattern of use. In some examples, the pattern of use may be used to adjust the set mixture. For example, if the supply levels are 10% K 80% C, 70% M, and 70% Y, and the pattern of use identifies a higher use of C over time, the set mixture may include ⅓ of each of C, M, and Y. In the example, although C print supply has a higher supply level than M and Y, the pattern of use may indicate or predict that the C print supply is to be depleted prior to M and/or Y print supplies based on prior or predicted use pattern. Although examples are not so limited.

In some examples, the method 100 includes applying a set of rules to the plurality of supply levels to set the mixture. For example, the method 100 may include selecting between the black print and the process black print and setting the mixture of the plurality of print supplies for the process black print based on the set of rules. Example rules include a threshold level of the black print supply associated with selecting the black print or the process black print, supply levels of the plurality of print supplies, types of objects associated with the print job, and variances in the plurality of supply levels, among other rules. The set of rules may be used to select the non-black print supplies and the percentage of each of the selected non-black print supplies to use in the process black print, and identify which objects in the print job to execute the process black print on, such as by identifying text objects. As an example, the process black print may be selected in response to the black print supply being below a threshold supply level, and the set of selected non-black supplies and the percentage may be selected based on supply levels, variances between supply levels, and/or use patterns which indicate or predict variances in depletion of the print supplies. In some examples, the set of rules used to set the mixture may include or be used to obtain the supply output values, as described above. For example, the set of rules may include the rebuilt color map.

In some examples, the method 100 includes applying a data model to input data to automatically set the mixture of the plurality of print supplies for the process black print. The input data may include the plurality of supply levels, patterns of use of the plurality of print supplies, variances between supply levels, predicted supply lifetime for the set of print supplies, types of objects of the print job, and a combination thereof. The predicted supply lifetime may be based on consumption rates, past or predicted use patterns for the print device and/or general trends. The objects may include the text objects or vector objects, as further described below.

In some examples, the data model applied to input data to set the mixture of the plurality of print may include an artificial intelligence (AI) model or machine learning model (MLM). Various ML frameworks are available from multiple providers which provide open-source ML datasets and tools to enable developers to design, train, validate, and deploy MLMs, such as AI/ML processors. AI/ML processors (also sometimes referred to as hardware accelerators (MLAs), or Neural Processing Units (NPUs)) may accelerate processing of MLMs. AI/ML processors may be integrated circuits (ASICs) that have multi-core designs and employ precision processing with optimized dataflow architectures and memory use to accelerate and increase computational throughput when processing MLMs.

MLMs may be stored as model files having a representational data format which describes the architecture of the model (e.g., input, output, hidden layers, layer weights, nodes of each layer, interconnections between nodes of different layers, and ML operations of each node/layer) along with operating parameters and, thus, describe or represent a process flow between input and output layers of an MLM. After development, the MLM may be deployed in environments other than the environment or framework in which the model was initially trained. For example, distributing computing devices of a cloud system may train the MLM and distribute the trained MLM to local computing devices and/or printer devices to implement.

In some examples, the data model applied to the input data (e.g., the MLM) is used to balance print performance with cost and supply lifetime of the plurality of print supplies. For example, the method 100 may include predicting the depletion of the plurality of print supplies based on the input data and selecting the black print or process black print and setting the mixture of print supplies for the process black print based on the prediction and using the data model. In various examples, non-black print supplies to use for the process black print are selected depending on the supply levels of the set of print supplies, with the selected non-black print supply having greater supply level(s) than the non-selected non-black print supply. By predicting the depletion of the plurality of print supplies, a service provider may initiate a replacement order of the plurality of print supplies in advance, thereby reducing costs caused by a rushed service, such as rushed shipping costs, labor costs (e.g., costs due to over time and/or holidays), and/or violating or triggering contractual agreed to terms that results in a penalty to the service provider, as described further below.

In some examples, the process black print may be applied to particular types of objects. The object type may be categorized using manual tagging or ML, such as object detection and categorization, with the black print or process black print being applied based on the object type, such as applying process black print to text objects and not to vector objects. The object(s) in the print job may be detected using a dataset and a MLM, such as identifying a location of object(s) and classifying an image or the object(s) using a Common Objects in Context (COCO) dataset and a Fast Region-Convolution Neural Network (R-CNN) and/or Mask R-CNN. Other examples may include use of COCO, Scene Understanding (SUN), ImageNet Large Scale Visual Recognition Competition (ILSVRC), Pattern Analysis Statistical Modelling and Computational Learning (PASCAL) Visual Object Classes (VOC) datasets and/or combinations thereof. Example MLMs include Faster R-CNN, You Only Look Once (YOLO), Single Shot Detector (SSD), Mask R-CNN, DeepLab, and/or Pyramid Scene Parsing Network (PSPNet). However, examples are not limited.

At 104, the method 100 includes initiating execution of the process black print of a print job by the print device using the set mixture of the plurality of print supplies as overlapping colorant with the black print supply of the print device. As used herein, a print job includes or refers to a file or set of files to be submitted to a print device, such as a data object that represents a document to be printed. A user may request a print job using a computing device, and the print job is communicated to the print device directly by the computing device or through another local or remote computing device, such as a local or remote server. The user may include an individual customer or a user associated with an organization which is the customer. The method 100 may further include executing the print job by the print device using the set mixture. For example, the print job may be executed using the rebuilt color map to set the mixture.

In various examples, the process black print may be applied depending on objects in the print job. For example, a process back print may be applied to text objects and a black print may be applied to vector objects in print jobs. The method 100 may include identifying objects within the print job and applying the set mixture for the text objects in the print job, such as via the object detection described above.

In some examples, the non-black print supply registration may be reduced from the black print supply registration for the process black print. By shrinking the non-black print supply registration from the black print supply registration, the effects of misregistration may be mitigated or reduced. In some examples, the method 100 includes identifying a text object associated with the print job, reducing non-black print supply registration from black print supply registration for the plurality of print supplies, and initiating the execution of the process black print of the print job using the set mixture of print supplies and the reduced non-black print supply registration for the text object.

In various examples, the method 100 may further include selecting between the process black print and a black print for the print job. The process black print may be applied in response to the black print supply being below a threshold level, such as a threshold supply level or threshold optical density. In some examples, prior to the black print supply reaching the threshold level, a black print may be used to print black content. However, examples are not so limited and may include selecting the process black print in response to use patterns.

In some examples, the process black print is executed without using half-toning for the black print supply. For example, the process black print may be executed using half-toning for non-black print supply (e.g., CMY colorants), and without using half-toning for the black print supply (e.g., K colorant), which may be used to achieve a fifty percent coverage. However, examples are not so limited and the process black print may be executed without using half-toning for some and/or all of the non-black print supplies along with the black print supply. Half-toning, as used herein, includes or refers to modulating a dot structure (e.g., on/off) to stimulate different gray levels on a printed document. As an example, when the optical density of black content is above a threshold and the printed document is to be executed in a light gray, black content may be executing using half-toning by turning the dots on and off using a pattern to simulate gray. When the optical density drops, the thickness of the toner pile height drops and the appearance of the paper may start to show through the toner. The solid may not be half-toned but the optical density may be lower.

In some examples, the method 100 includes initiating a replacement order corresponding to multiple print supplies of the plurality of print supplies. The replacement order may include two print supplies, three print supplies, or all of the plurality of print supplies, such as a subset or all of the CMYK print supplies.

In some examples, users of print devices may print documents within a contractual print system. For example, the print system may include print devices and/or print supplies which are provided to the customer by a service provider, and the service provider may maintain the print devices, such as replacing parts and/or reordering the print supplies. The system may be based on service plans that identify a number of pages printed per billing cycle and/or a pre-paid amount of pages. The service provider may manage billing for providing the service, order replacement print supplies and/or perform maintenance on the print device. In other examples, the service provider may provide a management print service, as further described below.

The service agreement may have associated terms, such as print costs, guaranteed print qualities, time for replacement print supplies to be received, and penalties to the service provided for failure to meet a term. The service agreement may define a cost per page that differs depending on the print job type (e.g., in black, in color, print quality), or may define a cost per page regardless of the print job type. The print service provider may track the consumption of the set of print supplies and is responsible for providing replacement print supplies. As another example, a customer may contract with a managed print service provider that is responsible for managing the health of the print device, including replacing print supplies. The managed print service provider may send an employee to the location of the print device to replace the print supplies. A managed print service, as used herein, refers to or includes locally managing the print device, such as a local visit by an employee of the service provider to a location of the print device to manage the health of the print device (e.g., replacing parts, replacing print supplies, and/or otherwise physically working on the print device). A print service refers to or includes remotely managing the print device, which is sometimes herein referred to as a "remote print service".

In some examples, the print system may be cloud-based, which may be referred to as a "cloud-based print system", and may provide a plurality of services, such a subscription service. A subscription service includes a service provided on a contractual basis for a period of time and for an agreed to amount. Example subscription services include a print supply replacement service and/or a service for a predefined number of printed pages.

A print supply replacement service may include tracking supply levels and providing automatic replacement of the set of print supplies of the print device, which may be ordered and replaced or refilled by the service provider. In some examples, when the print device identifies a print supply has reached a threshold level, the print device may communicate with the service provider, either directly or through a local computing device, and the service provider may automatically initiate a replacement order of the print supply or schedule an employee to visit. With a print supply replacement service, the customer may pay the subscription fee and the service provider is responsible for providing print supplies.

In various examples, the set of rules and/or the data model may be used to balance costs for the service provider with costs and print quality to the customer. For example, black print and process black print may be adaptively switched between and the mixture of non-black print supply may be adaptively set to extend the supply lifetime of the plurality of print supplies and coordinate depletion of the set of print supplies, while minimizing loss of print quality and cost to the customer and/or service provider. In some examples, the mixture of non-black print supplies is adaptively set and adjusted to improve print quality of black content while the black print supply is below a threshold level and while the customer is waiting for a replacement black print supply, and in a manner that coordinates depletion of the non-black print supply. In some examples, the amount of time the print device is operable is increased, and shipping costs and customer interaction servicing the print device is decreased as compared to separate shipments for the print supplies, which may reduce labor costs to the customer to install replacement print supplies. In some examples, the cost may be balanced to minimize costs to the customer and/or to the provider.

In various examples, the set of rules and/or data model may be updated over time. For example, the data model may be updated based on feedback provided. Example feedback includes updated input data and/or updates to the structure of the data model itself. As an example, the set of rules and/or data model may be updated based on a feedback pattern of use of the plurality of print supplies for the print device and/or patterns of use of print supplies of other print devices. For example, a print device, a user, or set of print devices may exhibit a particular pattern of use of print supplies, such as a higher consumption rate of Y print supply as compared to CM print supplies. In other examples, a general pattern may be observed as being common to many print devices, such as a higher consumption rate of C print supply as compared to YM print supplies. In some examples, particular organizations, industries, and/or geographies may exhibit specific patterns of use. Other example feedback include changes to the service agreement, information to categorize print jobs, changes in shipping and/or service parameters, and changes in types of print supply, among others.

In various examples, the method 100 may be implemented by the print device. A print device, as used herein, includes or refers to a device that makes a representation of text or graphics on physical media. In some examples, the method 100 may be implemented by a computing device local to the print device, such as a local computer or a local server in communication with the print device. In some examples, the method 100 may be implemented by a computing device remotely located from the print device, such as a distributed processor that may be a part of a cloud computing system and used to implement a print service or a managed print service. In further examples, the method 100 may be implemented using a combination of the print device, the computing device local to the print device and/or the remote computing device.

Figure 2:
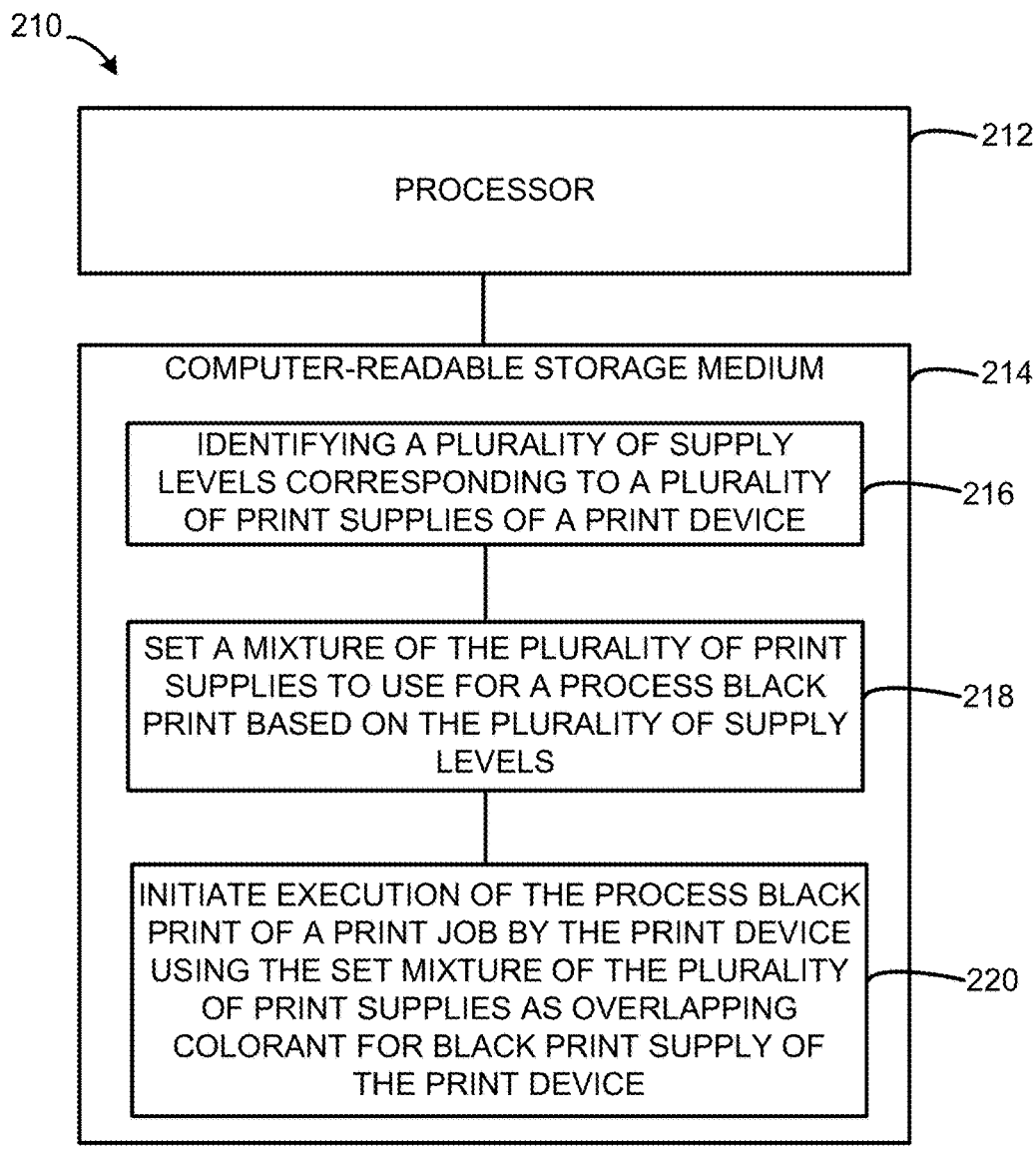
FIG. 2 illustrates an example device including non-transitory computer-readable storage medium, in accordance with examples of the present disclosure.

FIG. 2 illustrates an example device including non-transitory computer-readable storage medium, in accordance with examples of the present disclosure. The device 210 includes a processor 212 and memory. The memory may include a computer-readable storage medium 214 storing a set of instructions 216, 218, and 220.

The computer-readable storage medium 214 (as well as the computer-readable storage medium 594 illustrated by FIG. 5) may include Read-Only Memory (ROM), Random-Access Memory (RAM), Electrically Erasable Programmable Read-Only Memory (EEPROM), flash memory, a solid state drive, Electrically Programmable Read Only Memory aka write once memory (EPROM), physical fuses and e-fuses, and/or discrete data register sets. In some examples, computer-readable storage medium 214 may be a non-transitory storage medium, where the term "non-transitory" does not encompass transitory propagating signals.

At 216, the processor 212 may identify a plurality of supply levels corresponding to a plurality of print supplies of a print device. At 218, the processor 212 may set a mixture of the plurality of print supplies to use for a process black print based on the plurality of supply levels. The instruction to set the mixture may include instructions to select a set of non-black print supplies of the plurality of print supplies, and select a set of adjustable percentages for the set of non-black print supplies to use as the overlapping colorant for the black print supply during the process black print. At 220, the processor 212 may initiate execution of the process black print of a print job by the print device using the set mixture of the plurality of print supplies as overlapping colorant for the black print supply of the print device.

In various examples, the processor 212 may adaptively adjust the set mixture over time. For example, the processor 212 may track the plurality of supply levels over a supply lifetime of the plurality of print supplies and adaptively adjust the set mixture of the plurality of print supplies to use for process black print over the supply lifetime based on track plurality of supply levels. The adaptive adjustment may be used to improve print quality of black content and to coordinate depletion of the plurality of print supplies. In some examples, the processor 212 may initiate a replacement order, in response to respective print supply of the set of print supplies having supply levels below a threshold level, such as a replacement order for multiple print supplies at the same time.

As previously described, the mixture may be set based on a set of rules and/or a data model. In some examples, the processor 212 may select process black print, and set the mixture of the plurality of print supplies to use for the process black print based on the set of rules and/or data model and input data, such as the input data described in connection with method 100.

In some examples, as further described by FIG. 5, the processor 212 may adjust supply output values for a set of gray nodes and near neutral nodes in a color map for the print device based on a color balance target using the plurality of supply levels, and rebuild the color map for the process black print of the print device using the adjusted supply output values. The processor 212 may further set the mixture of the plurality of print supplies based on the rebuilt color map for the process black print. For example, the computer-readable storage medium 214 may further store the instructions 595, 597, 599 of FIG. 5.

In various examples, the processor 212 and computer-readable storage medium 214 may form part of the print device, part of a remotely-located computing device, or part of a computing device that is local to the print device, such as a local server or computer and sometimes herein referred to as "a local computing device". In some examples, the device 210 forms part of a cloud computing system having a plurality of remotely-located and/or distributed computing devices. For example, although FIG. 2 illustrates a single processor 212 and a single computer-readable storage medium 214, examples are not so limited and may be directed to devices and/or systems with multiple processors and multiple computer-readable storage mediums. The instructions may be distributed and stored across the multiple computer-readable storage mediums and may be distributed and executed by the multiple processors.

In some examples, the processor 212 may aggregate data associated with use patterns of print supplies for a plurality of print devices. For example, the processor 212 may aggregate the data, and provide analytics on the use of print supplies. The data analytics may be used to track use patterns of print supplies and predict depletion or consumption rates of print supplies of a plurality based on past use patterns of the particular print device, a particular user, and/or a plurality of print devices. The use patterns of print supplies may be used to supplement current supply levels to set the mixture of print supplies to use for the process black print and to coordinate depletion of the print supplies.

Figure 3:
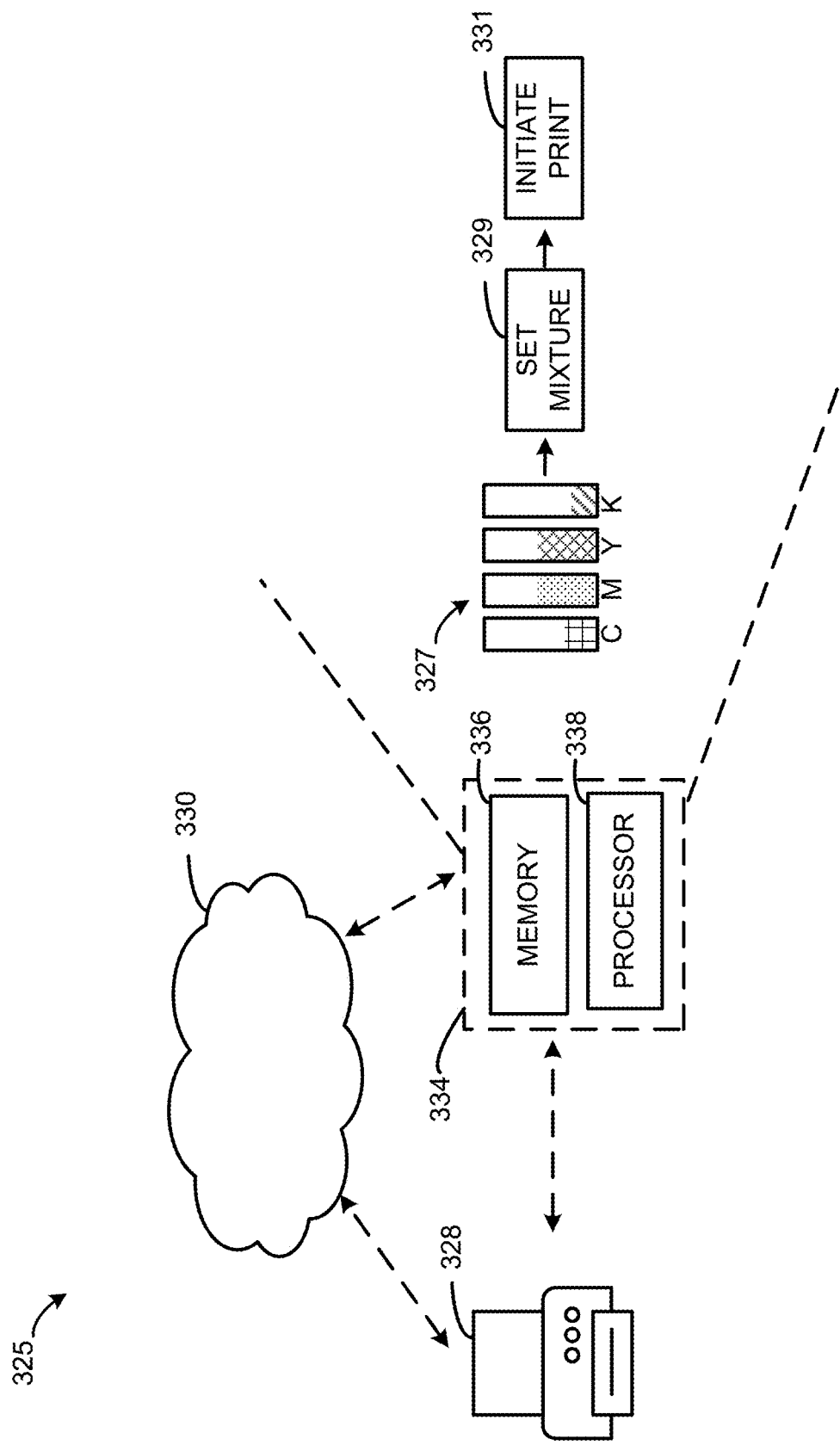
FIG. 3 illustrates an example system for setting a mixture of print supplies for a process black print, in accordance with examples of the present disclosure.

FIG. 3 illustrates an example system for setting a mixture of print supplies for a process black print, in accordance with examples of the present disclosure.

The system 325 includes a memory 336 and a processor 338. In some examples, the memory 336 and processor 338 may form part of a computing device 334. The computing device 334 may be local to the print device 328 or may include the print device 328 itself. In some examples, the computing device 334 is remote from the print device 328. The computing device 334 and print device 328 may communicate between one another and with other devices using data communications over the network 330. In other examples, the memory 336 and processor 338 may form part of different computing devices.

The memory 336 may store a plurality of supply levels 327 corresponding to a plurality of print supplies of the print device 328. The plurality of print supplies may be attached to the print device 328, such as being inserted into or installed. In some examples, the supply levels 327 may be tracked over supply lifetimes of the print supplies. In some examples, such as with cloud computing, the memory 336 stores a plurality of supply levels corresponding to a plurality of sets of print supplies of a plurality of print devices. The stored data may be used to identify use patterns of print supplies of the print device 328, use patterns of a user of the print device 328, and/or use patterns which are general across a plurality of print devices.

The processor 338 may track depletion of the plurality of print supplies based on the plurality of supply levels 327, assess for variances in the tracked depletion of the plurality of print supplies based on the plurality of supply levels 327, and set a mixture of the plurality of print supplies to use for process black print based on the assessed variances, at 329, as previously described. The processor 338 may initiate execution of the process black print of a print job by the print device 328 using the set mixture of the plurality of print supplies as overlapping colorant with the black print supply of the print device, at 331. As previously described, the processor 338 may set the mixture of the plurality of print supplies based on a rebuilt color map for the process black print, the rebuilt color map including adjusted supply output values for a set of gray nodes and near neutral nodes in the rebuilt color map based on the plurality of supply levels. In some examples, the processor 338 may rebuild the color map, as further described herein.

In some examples, the processor 338 may selectively apply the process black print and/or a black print depending on objects in the print job. For example, the processor 338 may classify a plurality of objects associated with the print job as text objects and vector objects, such as using a data model, a set of rules, and/or labels or tags within the print job which may be applied manually by a user or automatically using the data model. The processor 338 may initiate execution of the process black print of the print job for the text objects and a black print for the vector objects of the print job. The determination may be per object on each page. In some examples, all objects within a single document are treated the same way. For example, all text objects may be printed using process black print. In some examples, the color separation may be varied when printing text, vector, and raster independently.

In some examples, the processor 338 may adaptively adjust the set mixture over time based on the assessed variances in depletion (e.g., supply levels, consumption rates, and/or supply lifetimes), and initiate execution of a plurality of print jobs using black print and the process black print with the adaptively adjusted set mixture to coordinate depletion of the plurality of print supplies, where the plurality of print jobs include the print job. The adaptive adjustment may include adjustments to selected non-black print supplies of the plurality of print supplies in the set mixture, and adjustments to percentages of the selected non-black print supplies.

In some examples, the processor 338 may initiate a replacement order corresponding to multiple print supplies of the plurality of print supplies based on the coordinated depletion of the plurality of print supplies. For example, the processor 338 may initiate a replacement order corresponding to N print supplies of the plurality of print supplies, wherein N is greater than one. In some examples, N is two print supplies, N is three print supplies, and/or N is the plurality of print supplies, e.g., CMYK.

In some examples, the processor 338 instructs the print device 328 to execute the process black print of the print job using the set mixture. The processor 338 may directly instruct the print device 328 or indirectly through a local computing device, such as the computing device 334.

In some examples, the system 325 includes a plurality of distributed computing devices used to provide the print service, such as a print supply replacement service or a managed print service. The plurality of distributed computing devices may include servers and/or databases that form part of a cloud computing system. The memory 336 and processor 338 may form part of the plurality of distributed computing devices to provide the print service. In some examples, one of the plurality of distributed computing devices may include the memory 336 and the processor 338. In other examples, the memory 336 may form part of a first distributed computing device and the processor 338 may form part of a second distributed computing device of the plurality.

The example system 325 may communicatively connect the plurality of distributed computing devices to a plurality of external devices over the network 330. The plurality of external devices may include a plurality of print devices including the print device 328 and/or a plurality of end-user computing devices including the computing device 334. Example end-user computing devices include desktop computers, laptops, tablets, and smartphones. In some such examples, the processor 338 may select the set mixture of the plurality of print supplies based on a set of rules, a data model, or a combination thereof, and instruct the print device 328 to initiate the execution of the process black print of the print job using the set mixture.

However, examples are not so limited. In some examples, the memory 336 and processor 338 form part of the print device 328, and the processor 338 selects the set mixture of the plurality of print supplies based on a set of rules, a data model, or a combination thereof, and executes the process black print of the print job using the set mixture. In some examples, the memory 336 and processor 338 form part of the computing device 334 and the processor 338 is to select the set mixture of the plurality of print supplies based on a set of rules, a data model, or a combination thereof, and instruct the print device 328 to initiate the execution of the process black print of the print job using the set mixture. In some examples, the computing device 334 may be in communication with the distributed computing devices and the data model may be obtained from the cloud computing system over the network 330.

Figure 4A:
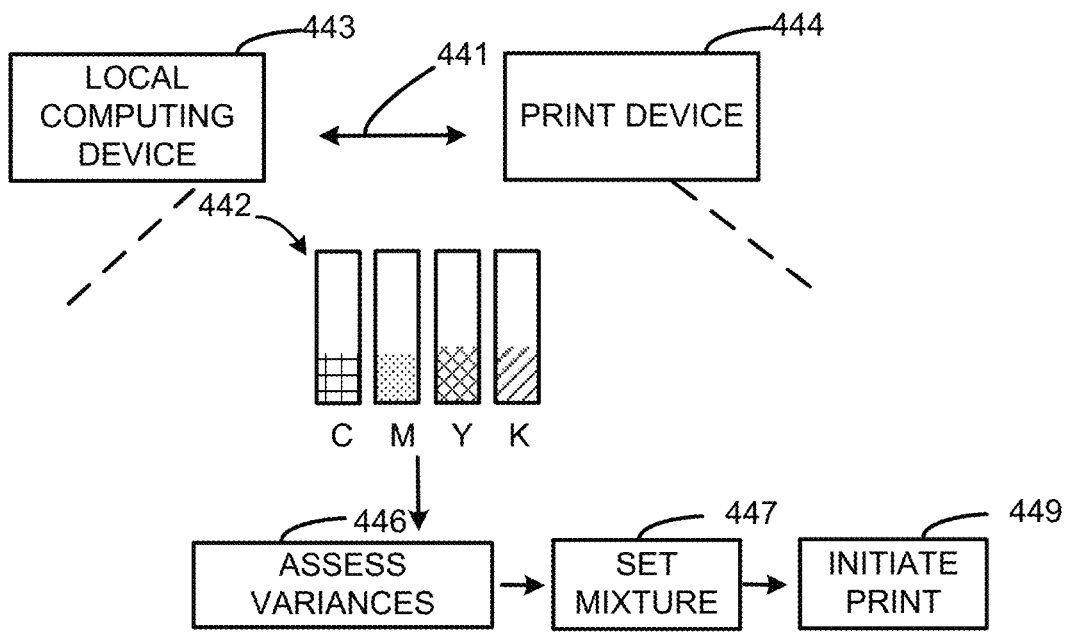
FIGS. 4A-4C illustrate example systems for setting a mixture of print supplies for a process black print, in accordance with examples of the present disclosure.
Figure 4B:
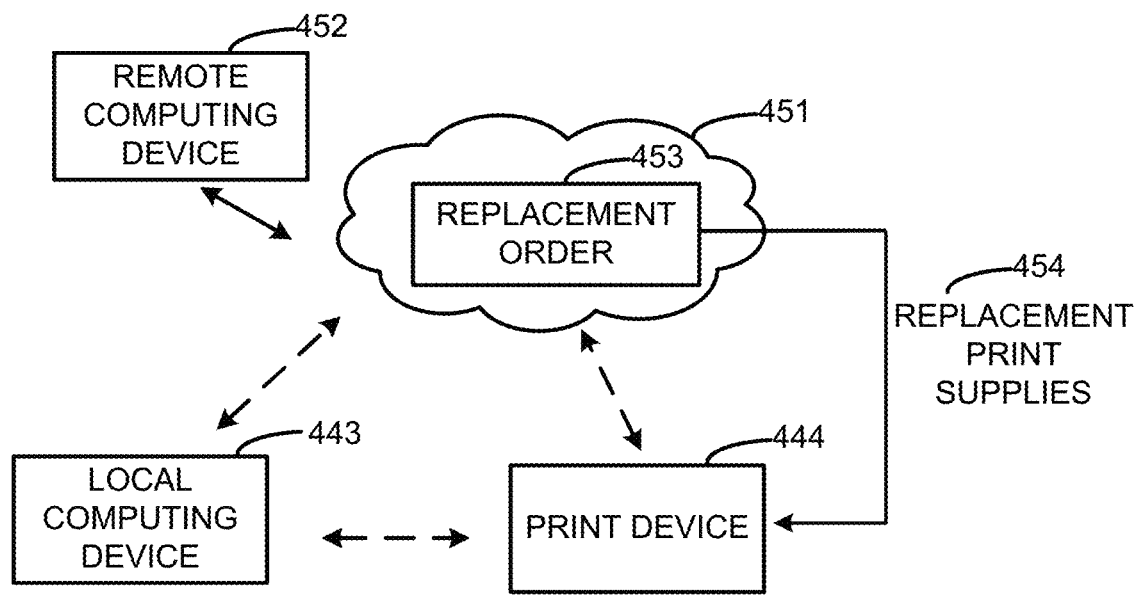
Figure 4C:
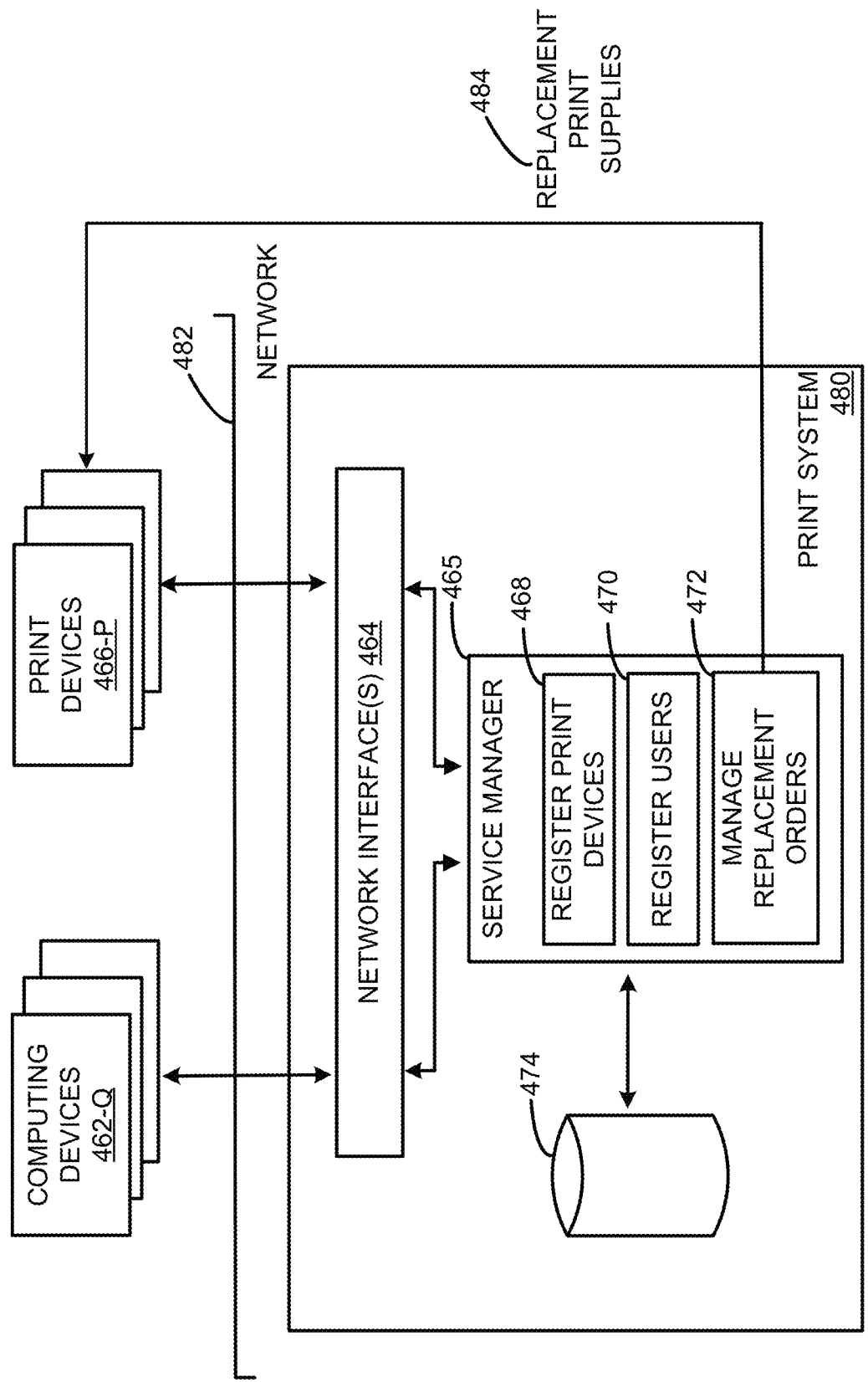

FIGS. 4A-4C illustrate example systems for setting a mixture of print supplies for a process black print, in accordance with examples of the present disclosure.

FIG. 4A illustrates an example system that includes a print device 444 and a local computing device 443 that instructs the print device 444 to execute a print job using a network communication 441. In some examples, the print device 444 may include the device 210 of FIG. 2 and/or may implement the method 100 illustrated by FIG. 1 to identify a plurality of supply levels 442 corresponding to a plurality of print supplies, e.g., CMYK, assess for variances in depletion of the plurality of print supplies using the supply levels 442, at 446, set a mixture of the plurality of print supplies to use for a process black print based on the assessed variances, at 447, and initiate execution of the process black print, at 449, by printing the print job. In other examples, the local computing device 443 may include the device 210 of FIG. 2 and/or may implement the method 100 illustrated by FIG. 1 to identify the supply levels 442, assess for variances in depletion of the print supplies, at 446, set the mixture of the plurality of print supplies, at 447, and initiate execution of the process black print, at 449, by instructing the print device 444 to print the print job.

The mixture may be adaptively set over time based on variances in depletion of the print supplies to coordinate the depletion of the plurality of print supplies, such as reducing variances in supply levels between a plurality of print supplies of the set. In some examples, the mixture may additionally be set based on patterns of use, as previously described. In the particular example, each of the print supplies has a similar supply level and may be replaced in a single replacement order. However, examples are not so limited, and the coordinated depletion may include two print supplies or three print supplies.

FIG. 4B illustrates an example system that includes a print device 444, a local computing device 443, and a remote computing device 452 which forms part of a cloud computing system 451 or other type of system.

In some examples, the local computing device 443 may include a local server in communication with and/or controlled by the cloud computing system 451. For example, the remote computing device 452 may provide instructions to the local computing device 443, which may set a mixture of a plurality of print supplies to use for a process black print. The instruction may include a data model or set of rules, such that the local computing device 443 may set the mixture locally. The local computing device 443 may receive the request for the print job from a user, select between black print and process black print for the print job and/or for objects within the print job, set the mixture of the plurality of print supplies to use for the process black print, and instruct the print device 444 to execute the print job based on the selection and the set mixture. In other examples, the remote computing device 452 or the local computing device 443 may provide instructions to the print device 444, such that the print device 444 may determine the selection.

In some examples, the remote computing device 452 may drive the selection between black print and process black print and/or setting the mixture of print supplies to use for the process black print. The local computing device may communicate data indicative of a request for a print job to the remote computing device 452 or to the print device 444 which communicates with the remote computing device 452. In response to the communication, the remote computing device 452 selects between black print and process black print for the print job and/or for objects within the print job, sets the mixture of the plurality of print supplies to use for the process black print, and instructs the print device 444 to execute the print job based on the selection, either directly or through the local computing device 443.

Some examples may include a combination of remote and local processing. For example, the remote computing device 452 may use a data model to determine a set of rules or to train the data model to provide to the local computing device 443 or the print device 444. For example, the remote computing device 452 may rebuild a color map and communicate the rebuilt color map to the print device 444. The local computing device 443 or the print device 444 may locally select between process black print and black print or the print job and/or for objects within the print job, and set the mixture of the plurality of print supplies to use for the process black print using the set of rules or the trained data model. The remote computing device 452 may send updated rules based on revisions to the data model or provide a revised trained data model, among other revisions.

In various examples, the remote computing device 452, the local computing device 443, or the print device 444 may initiate a replacement order 453 for the plurality of print supplies. The replacement order 453 may be initiated in response to threshold supply levels, predicted supply lifetimes, and/or based on shipping or services times, among other data. In some examples, the initiation of the replacement order 453 may cause shipment of replacement print supplies 454 to the customer.

FIG. 4C illustrates an example print system for print supply management, in accordance with examples of the present disclosure. The print system 480 may provide a registration process for print devices, and may manage replacement orders for print supplies. The print system 480 may be implemented by a remote service provider. The print system 480 may be used to provide a portal to receive data as part of a registration process from print devices 466-P and/or computing devices 462-Q and includes a service manager 465 to manage services for registered users.

The components of the print system 480 may be implemented using computer-readable instructions and/or on a computing device, such as a server, a laptop, a computing device, or on a plurality of distributed computing devices including distributed processor and memory resources that may communicate with one another and with other devices over the network 482. The computing device(s) may operate to execute computer-readable instructions, such as described above, to perform the processes described herein and related to the various components of the print system 480. The print system 480 may be cloud-based, for example, and/or may be implemented through other computer systems in alternative architectures, such as a peer-to-peer network.

The print system 480 may communicate with computing devices 462-Q and print devices 466-P over the network 482 using a network interface 464. In various examples, the print system 480 includes a plurality of network interfaces for communicating over a plurality of networks, such as wireless and wired networks. In a specific example, the print system 480 communicates with the computing devices 462-Q via the network interface 464 and a portal or an application programming interface (API).

The print system 480 includes a service manager 465 that manages a plurality of services for users registered with the print system 480. The service manager 465 may provide a registration process in which a user registers the user or an associated organization with a print service, at 470, and may optionally register print devices 466-P to be accessible, at 468. The service manager 465 stores the various data for registration in memory, such as in a database 474. Although one database 474 is illustrated, example print systems 480 include a plurality of databases stored on memory resources and which are accessible by a plurality of distributed processors which may implement the service manager 465.

In some examples, the registration process may include execution of a service agreement with the service provider. The service agreement may set out terms and parameters for providing the particular print service for the account. For example, the service agreement may specify a cost to print a page using particular type of print.

The service manager 465 monitors use of the print services across the print devices 466-P. For example, the service manager 465 may monitor print supplies of the plurality of print devices 466-P based on the tracked supply levels and may manage replacement orders 472. Managing the replacement orders may include automatically initiating a replacement order for print supplies of a print device. In some examples, managing the replacement orders may include adaptively switching between black print and process black print for the print devices 466-P depending on the print jobs and respective supply levels, adaptively setting mixtures of print supplies to use for the process black print for the print devices 466-P, and initiating the replacement order in response to supply level(s) of respective print supplies reaching a threshold level. The switching and setting of mixtures may be controlled remotely by the service manager 465 or locally by the print devices 466-P and/or the computing devices 462-Q using a set of rules and/or a trained data model, as previously described. For example, the service manager 465 may rebuild a color map.

By adaptively switching between the black print and process black print and setting the mixtures of the print supplies to use for the process black print, supply lifetimes may be extended and the plurality of print supplies for respective print devices may be depleted in a coordinated manner to allow for reduced costs to the service provider for replacing the print supplies across the print system 480 with increased time between supply change events and reduced customer interaction for replacing the print supply of the print devices 466-P. Further, the process black print may improve print quality for black content when the black print supply is below a threshold amount and prior to a replacement black print supply being received. The service manager 465 may manage the replacement orders to balance cost to the service provider and the customer with print quality. In some examples, the replacement print supplies 484 are ordered by the service manager 465, such as by initiating an order for multiple of the plurality of print supplies at a supply source. The replacement print supplies 484 may be shipped from the supply source to a location associated with the print device for installation. In other examples, the replacement print supplies 484 are ordered by the service manager 465 scheduling an appointment with an employee of the service provider. The employee may travel to the location of the print device and install the replacement print supplies 484.

FIG. 5 illustrates an example device including non-transitory computer-readable storage medium, in accordance with examples of the present disclosure. The device 590 includes a processor 592 and memory. The memory may include a computer-readable storage medium 594 storing a set of instructions 595, 597, and 599. In some examples, the device 590 is a separate device from the device 210 of FIG. 2. In some examples, the device 590 forms part of the device 210.

At 595, the processor 592 may receive a color balance target for a plurality of print supplies of a print device. The color balance target may include or be based on variances in the supply levels of the print supplies of the print device. As previously described, the color balance target may be used to adjust a color map and to set a mixture of print supplies to use for the process black print based on the plurality of supple levels. The color balance target may be used to reduce variances in the supply levels.

At 597, the processor 592 may adjust supply output values for a set of gray nodes and/or near neutral nodes in a color map for the print device based on the color balance target. The supply output values include values of the plurality of print supplies to use to achieve different colors of the color space. As previously described, the color map may comprise a look-up table including a plurality of nodes representing a sampling of the color space (e.g., a range of colors that the print device may produce) and supply output values for the plurality of nodes. Each node may represent a specific color of the color space and may have an associated supply output value (e.g., amounts or values of CMYK) to use to achieve the specific color. The plurality of nodes may include gray nodes, near neutral nodes, and nodes for other non-black colors. The adjusted supply output values for the set of gray nodes and/or near neutral nodes may shift a color balance of the black point toward the color balance target.

At 599, the processor 592 may rebuild the color map for a process black print of the print device using the adjusted supply output values. In some examples, the processor 592 may rebuild the color map by providing final supply output values of the plurality of print supplies using the adjusted supply output values. The final supply output values include interpolated supply output values, which may include the adjusted supply output values, of surrounding nodes in the rebuilt color map. In some examples, the final supply output values may include interpolated supply output values of surrounding nodes in the rebuilt color map and which may be used to provide supply output values for colors of the range which are between respective nodes (e.g., between samplings of the color map). The processor 592 may interpolate the supply output values of surrounding nodes in the rebuilt color map to provide the final supply output values for respective gray and/or near neutral colors, among other colors. For example, the processor 592 may interpolate respective adjusted supply output values of surrounding nodes of a gray color, and the interpolated value is used as the final output value for the gray color, where the gray color may not be a 100 percent match to a specific gray color represented by any gray node. The supply output values for each of the gray nodes and/or near neutral nodes in the set may be adjusted to shift the color balance of the black point and in a manner that minimizes noticeability of the color balance shift.

In some examples, the processor 592 may initiate execution of the process black print of a print job by the print device using a mixture of the plurality of print supplies as overlapping colorant for black print supply of the print device based on the color map with the adjusted supply output values. For example, the processor 592 may communicate the rebuilt color map to the print device to use for the process black print. In some examples, the color map is rebuilt using the adjusted supply output values and provided to the print device, which interpolates the supply output values of surrounding nodes to execute a print job. In other examples, the processor 592 forms part of the print device and executes the process black print.

In some examples, the processor 592 adjusts the supply output values and rebuilds the color map on-the-fly using the color balance target. For example, the processor 592 may receive updated color balance targets for the print device over time, including the color balance target, and rebuilds the color map on-the-fly and over time.

In various examples, the processor 592 and computer-readable storage medium 594 may form part of the print device, part of a remotely-located computing device, or part of a computing device that is local to the print device. In some examples, the device 590 forms part of a cloud computing system having a plurality of remotely-located and/or distributed computing devices. For example, although FIG. 5 illustrates a single processor 592 and a single computer-readable storage medium 594, examples are not so limited and may be directed to devices and/or systems with multiple processors and multiple computer-readable storage mediums. The instructions may be distributed and stored across the multiple computer-readable storage mediums and may be distributed and executed by the multiple processors.

Figure 6:
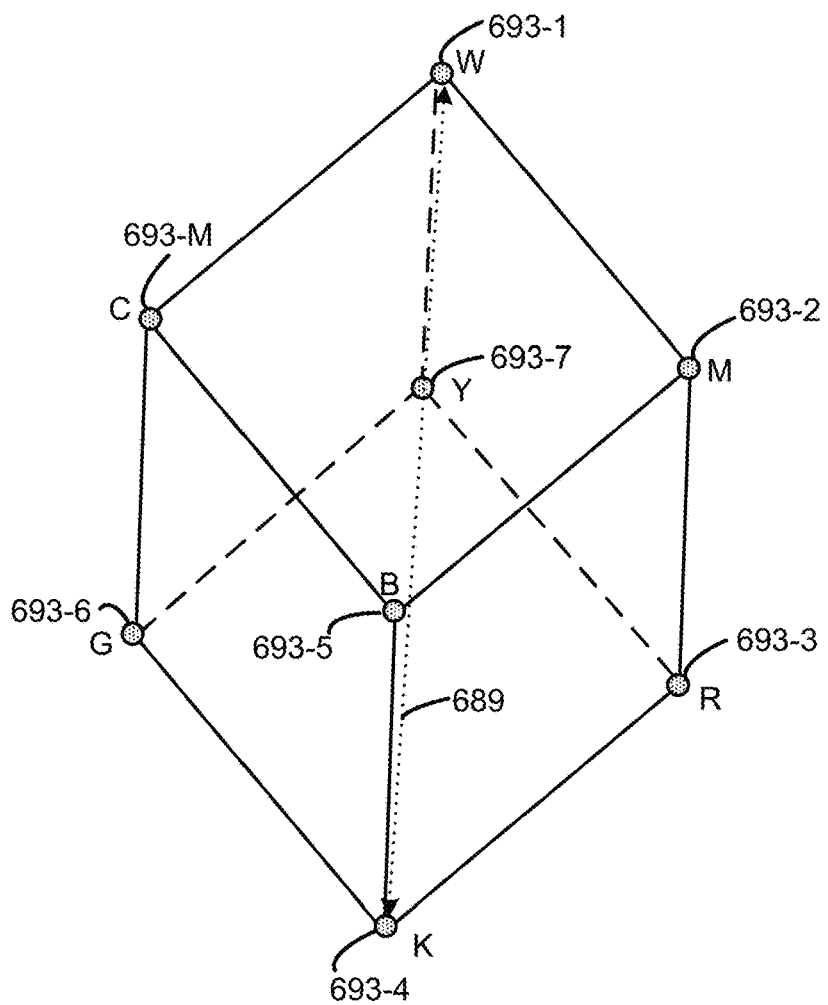
FIG. 6 illustrates an example cube representation of a color map, in accordance with examples of the present disclosure.

FIG. 6 illustrates an example cube representation of a color map, in accordance with examples of the present disclosure. As previously described, the color map may include or represent a three dimensional cube 691 containing a plurality of nodes 693-1, 693-2, 693-3, 693-4, 693-5, 693-6, 693-7, 693-M (herein generally referred to as "the nodes 693" for ease of reference) that represent a sampling of the color space. For ease of reference, FIG. 6 illustrates corner nodes only and the cube 691 may include additional nodes between the illustrated nodes 693, such as forming dimensions of $17^3$, $17^4$, or $19^4$ nodes. Although the nodes 693 are illustrated as points, the nodes 693 may be three dimensional in shape, such as forming sub-cubes and/or balls of the cube 691.

The set of gray nodes and near neutral nodes may be associated with the diagonal 689 of the cube 691 from the white (W) corner node 693-1 to the K corner node 693-4. The set of gray nodes may be along the diagonal 689 and may include both the W corner node 693-1 and the K corner node 693-4. The near neutral nodes may be off-center from the diagonal 689, such as nodes moving away from the diagonal 689 and toward the other corner nodes 693-2, 693-3, 693-5, 693-6, 693-7, 693-M as the cube 691 goes from gray to full color. For example, the full colors may be associated with a red (R) corner node 693-3, a green (G) corner node 693-6, a blue (B) corner node 693-5, a C corner node 693-M, a M corner node 693-2, a Y corner node 693-7 (e.g., RGBCMY). The supply output values for the set of gray nodes and near neutral nodes may be adjusted based on a color balance target, as previously described.

In various examples, the final supply output values of the plurality of print supplies for the range of potential colors of a print device may be based on an interpolation of supply output values of surrounding nodes of the cube 691. The surrounding nodes may include a sub-region of the cube 691, such as nodes that surround a spatial location of an input color in the cube 691. For example, the final supply output values of print supplies used to achieve a particular gray color along the diagonal 689 may be calculated by identifying where in the cube 691 the particular gray color is located, a distance between the location in the cube 691 of the particular gray color and surrounding nodes (e.g., four nodes in four directions), and weighing the supply output values of the surrounding nodes, which may include adjusted supply output values, based on the distances. In some examples, a subset of the surrounding nodes may be used for the interpolation, such as four nodes of eight surrounding nodes and/or the nodes that surround the RGB triplet of the input color. The weights may represent the CMYK supply output values used to print the input RGB color. The interpolation may be performed for the range of potential colors, and may reduce a storage size of the color map and while allowing for generation of the full range of potential colors. By adjusting the supply output values for the set of gray and/or near neutral nodes, any color that surrounds (e.g., depends upon) the set of gray and/or near neutral nodes are adjusted due to the interpolation.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method comprising:
    tracking depletion of a plurality of print supplies based on a plurality of supply levels corresponding to the plurality of print supplies of a print device;

setting a mixture of the plurality of print supplies to use for a process black print based on the plurality of supply levels corresponding to the plurality of print supplies and variances in the tracked depletion of the plurality of print supplies; and initiating execution of the process black print of a print job by the print device using the set mixture of the plurality of print supplies as overlapping colorant with black print supply of the print device.

2. The method of claim 1, wherein setting the mixture includes selecting non-black print supplies of the plurality of print supplies and selecting a percentage of the selected non-black print supplies to use as the overlapping colorant with the black print supply.

3. The method of claim 1, wherein the plurality of print supplies includes the black print supply and a plurality of non-black print supplies and setting the mixture of the plurality of print supplies includes:

selecting a set of non-black print supplies among the plurality of non-black print supplies to use as the overlapping colorant with the black print supply to coordinate depletion of the plurality of print supplies and to increase optical density as compared to a black print using the black print supply without the set of non-black print supplies.

4. The method of claim 3, wherein selecting the set of non-black print supplies among the plurality of non-black print supplies includes:

identifying the variances in tracked depletion of the plurality of supply levels; and selecting the set of non-black print supplies based on the variances, wherein the set of non-black print supplies includes between one non-black print supply and the plurality of non-black print supplies.

5. The method of claim 1, further including:

identifying the plurality of supply levels corresponding to the plurality of print supplies;

identifying a pattern of use of the plurality of print supplies using the plurality of supply levels; and setting the mixture of the plurality of print supplies based on the pattern of use.

6. The method of claim 1, further including:

identifying a text object associated with the print job;

reducing non-black print supply registration from black print supply registration for the plurality of print supplies; and initiating the execution of the process black print of the print job using the set mixture of the plurality of print supplies, and the reduced non-black print supply registration for the text object.

7. The method of claim 1, further including selecting between a black print and the process black print and setting the mixture of the plurality of print supplies for the process black print based on a set of rules, the set of rules being associated with:

a threshold level of the black print supply, types of objects associated with the print job, and variances in the plurality of supply levels.

8. The method of claim 1, further comprising:

setting the mixture in response to the black print supply being below a threshold level; and executing the process black print for the print job without using half-toning for the black print supply.

9. The method of claim 1, further including setting the mixture of the plurality of print supplies based on a rebuilt color map for the process black print, the rebuilt color map including adjusted supply output values for a set of gray nodes and near neutral nodes in the rebuilt color map based on a color balance target, wherein the color balance target is based on the plurality of supply levels.

10. The method of claim 1, further including assessing for the variances in the tracked depletion of the plurality of print supplies.

11. A non-transitory computer-readable storage medium comprising instructions that when executed cause a processor to:

identify a plurality of supply levels corresponding to a plurality of print supplies of a print device;

set a mixture of the plurality of print supplies to use for a process black print based on the plurality of supply levels and based on a rebuilt color map for the process black print, the rebuilt color map including adjusted supply output values for a set of gray nodes and near neutral nodes in the rebuilt color map based on a color balance target; and initiating execution of the process black print of a print job by the print device using the set mixture of the plurality of print supplies as overlapping colorant for black print supply of the print device.

12. The non-transitory computer-readable storage medium of claim 11, wherein the instructions to cause the processor to set the mixture include instructions to:

select a set of non-black print supplies of the plurality of print supplies; and select a set of adjustable percentages for the set of non-black print supplies to use as the overlapping colorant for the black print supply during the process black print.

13. The non-transitory computer-readable storage medium of claim 11, further including instructions that when executed, cause the processor to:

track the plurality of supply levels over a supply lifetime of the plurality of print supplies; and adaptively adjust the set mixture of the plurality of print supplies to use for process black print over the supply lifetime of the plurality of print supplies based on the tracked plurality of supply levels and to coordinate depletion of the plurality of print supplies.

14. The non-transitory computer-readable storage medium of claim 11, further including instructions that when executed, cause the processor to set the mixture of the plurality of print supplies based on one of:

a set of rules, a data model, and a combination thereof.

15. The non-transitory computer-readable storage medium of claim 11, further including instructions that when executed, cause the processor to:

adjust supply output values for a set of gray nodes and near neutral nodes in a color map for the print device based on a color balance target using the plurality of supply levels;

rebuild the color map for the process black print of the print device using the adjusted supply output values; and setting the mixture of the plurality of print supplies based on the rebuilt color map for the process black print.

16. The non-transitory computer-readable storage medium of claim 11, wherein the color balance target is based on the plurality of supply levels.

17. A system comprising:

a memory to store a plurality of supply levels corresponding to a plurality of print supplies of a print device;

a processor to:

track depletion of the plurality of print supplies based on the plurality of supply levels;

assess for variances in the tracked depletion of the plurality of print supplies;

set a mixture of the plurality of print supplies to use for process black print based on the assessed variances; and initiate execution of the process black print of a print job by the print device using the set mixture of the plurality of print supplies as overlapping colorant with black print supply of the print device.

18. The system of claim 17, wherein the processor is to:

adaptively adjust the set mixture over time based on the tracked depletion and assessed variances; and initiate execution of a plurality of print jobs using black print and the process black print with the adaptively adjusted set mixture to coordinate depletion of the plurality of print supplies, wherein the plurality of print jobs include the print job.

19. The system of claim 17, wherein the processor is further to:

classify a plurality of objects associated with the print job as text objects and vector objects; and initiate the execution of the process black print of the print job for the text objects and black print for the vector objects of the print job.

20. The system of claim 17, wherein the processor is further to set the mixture of the plurality of print supplies based on a rebuilt color map for the process black print, the rebuilt color map including adjusted supply output values for a set of gray nodes and near neutral nodes in the rebuilt color map based on the plurality of supply levels.

* * * * *